(12) United States Patent
Morales et al.

(10) Patent No.: US 8,136,120 B2
(45) Date of Patent: Mar. 13, 2012

(54) METHODS AND SYSTEMS OF RECONCILING SOURCES OF PRINT JOB PROCESSING INFORMATION IN A PRINT PROCESSING ENVIRONMENT

(75) Inventors: Javier A. Morales, Irondequoit, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1159 days.

(21) Appl. No.: 11/870,107

(22) Filed: Oct. 10, 2007

(65) Prior Publication Data

US 2009/0100426 A1 Apr. 16, 2009

(51) Int. Cl.
*G06F 9/46* (2006.01)
*H04N 1/60* (2006.01)
*G06K 15/00* (2006.01)
(52) U.S. Cl. .............................. 718/106; 358/1.9; 358/2.1
(58) Field of Classification Search .................... None
See application file for complete search history.

(56) References Cited

U.S. PATENT DOCUMENTS

| 5,760,775 | A | 6/1998 | Sklut et al. | |
|---|---|---|---|---|
| 5,790,119 | A | 8/1998 | Sklut et al. | |
| 7,349,124 | B2 * | 3/2008 | Zuber | 358/1.9 |
| 2006/0187485 | A1 * | 8/2006 | Lankreijer et al. | 358/1.15 |
| 2006/0271876 | A1 | 11/2006 | Holmes et al. | |
| 2007/0229895 | A1 * | 10/2007 | Fujimori et al. | 358/1.16 |
| 2008/0266594 | A1 * | 10/2008 | Lankreijer et al. | 358/1.15 |

\* cited by examiner

*Primary Examiner* — Camquy Truong
(74) *Attorney, Agent, or Firm* — Pepper Hamilton LLP

(57) ABSTRACT

A method of processing a print job in a document production environment includes receiving a job ticket having job ticket parameters, identifying a process plan template having processing instructions for processing the print job and performing a parameter value resolving process for each job ticket parameter. The resolving process may include identifying candidate values, identifying the source associated with each of the candidate values and determining whether a candidate value has a source having precedence. If a source has precedence, the corresponding candidate value may be selected as a resolved parameter value. A user may be presented with a representation of a set of the resolved parameter values and may be permitting to modify at least one of the resolved parameter values. A first portion of the print job may be processed using the identified process plan template, the resolved parameter values, and any user-modified parameter values.

17 Claims, 2 Drawing Sheets

METHODS AND SYSTEMS OF RECONCILING SOURCES OF PRINT JOB PROCESSING INFORMATION IN A PRINT PROCESSING ENVIRONMENT

BACKGROUND

It is common for a document production environment to process a print job based on one or more parameters from a job ticket associated with the print job. Exemplary parameters may include paper size, reduction or enlargement percentage, imposition and the like. Storing all of the necessary parameter values on a single job ticket can be impractical however, especially when the parameter values can originate from multiple sources. For example, a typical prepress operator can use a variety of parameters, such as imposition, computer-to-plate resolution, screen ruling, trapping details and the like. The values corresponding to these parameters may originate from a variety of sources such as job tickets, queue overrides, metadata, Page Description Language ("PDL") analysis results, job manifests and the like.

In addition, a job ticket may not support the required information or an application that generates a job ticket may not have access to the required information. For example, a management information system is seldom aware of a specific Page Description Languages associated with a job, and, therefore, cannot use PDL properties to populate job tickets. As such, it is important for a document production environment to determine a parameter's value from multiple sources of potential values.

Currently, the scope of information handled by certain job tickets is limited. A Job Definition Format ("JDF") job ticket may represent a broad scope of job ticket information. For example, a JDF job ticket may include all job information submitted with the job, and the job ticket may remain with the job from creation through production to ensure proper processing. However, systems that create JDF job tickets often do not have access to information that would otherwise not be included in the JDF job ticket. In addition, systems that have information required for processing are often constrained in their ability to pass that information to processing components.

In addition, the parameter definitions for most job ticket formats are often too restricted because these formats do not support the full breadth of job ticket information required to process a job. In addition, some job ticket parameters are not found in job tickets, but are rather derived from the values of other parameters. As such, these parameters are not intuitive because there is no single source that can be used to populate a production job ticket.

Parameter values are rarely intuitive and the parameter definitions are usually too restricted to fully automate an advanced workflow. Moreover, requiring a user to remember parameter names and accurately enter them discourages a user from using such parameter values. Typically, a user examines and revises print jobs based on the print job requirements prior to dispatching the print jobs to an automated workflow. This approach presents many drawbacks, however. For example, it is extremely easy to inadvertently enter invalid variable names. Moreover, the current approach uses variable values in their entirety, which does not provide the flexibility needed to automate processing decisions. In addition, parameter names cannot be used to set derived values.

Because parameter values may be determined based on a variety of content from a variety of different sources, each of which may or may not be known, determining the sources of parameter values often occurs piecemeal, and users are often unaware of the source of the values used.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "parameter" is a reference to one or more parameters and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of processing a print job in a document production environment may include receiving a job ticket that includes job ticket parameters for a print job, identifying a process plan template comprising one or more processing instructions for processing the print job and performing a parameter value resolving process for each job ticket parameter. The resolving process may include identifying, from a plurality of sources, a plurality of candidate values for the job ticket parameter, identifying the source associated with each of the candidate values and determining whether one of the candidate values has a source with precedence over the sources for the other candidate values. If a source has precedence, the candidate value whose source has precedence may be selected as a resolved parameter value. In addition, the method may include presenting a user with a representation of a set of the resolved parameter values, permitting the user to modify at least one of the resolved parameter values to yield a user-modified parameter value and processing a first portion of the print job using the identified process plan template, at least one of the resolved parameter values, and any user-modified parameter values.

In an embodiment, a method of processing a print job in a document production environment may include receiving a job ticket that includes job ticket parameters for a print job, identifying a process plan template comprising one or more processing instructions for processing the print job and performing a parameter value resolving process for each job ticket parameter. The method may also include enabling a user to modify at least one resolved parameter value in the first set to yield a first set of final parameter values and processing a first portion of the print job using the identified process plan template and the final parameter values. After at least one instruction from the identified process plan template has been implemented, the parameter value resolving process may be performed for each parameter value that has not yet been resolved to yield a second set of resolved parameter values. A second portion of the print job may be processed using the identified process plan template, the final parameter values, and the second set of resolved parameter values.

In an embodiment, a method of processing a print job in a document production environment may include receiving a job ticket that includes job ticket parameters for a print job, identifying a process plan template comprising one or more processing instructions for processing the print job and performing a parameter value resolving process for each job ticket parameter. The resolving process may include identifying, from a plurality of sources, a plurality of candidate values for the job ticket parameter, identifying the source associated with each of the candidate values and determining whether one of the candidate values has a source with precedence over the sources for the other candidate values. If a source has precedence, the candidate value whose source has precedence may be selected as a resolved parameter value. In addition, the method may include presenting a user with a representation of a set of the resolved parameter values, permitting the user to modify at least one of the resolved parameter values and automatically selecting the candidate value for the user-selected source as a user-modified parameter value. A first portion of the print job may be processed using the identified process plan template, at least one of the resolved parameter values and any user-modified parameter values.

In an embodiment, a system for processing a print job in a document production environment may include a processor and a processor-readable storage medium containing one or more programming instructions for performing a method of processing a print job in a document production environment. The method may include receiving a job ticket that includes job ticket parameters for a print job, identifying a process plan template comprising one or more processing instructions or processing the print job and performing a parameter value resolving process for each job ticket parameter. The resolving process may include identifying, from a plurality of sources, a plurality of candidate values for the job ticket parameter, identifying the source associated with each of the candidate values and determining whether one of the candidate values has a source with precedence over the sources for the other candidate values. If a source has precedence, the candidate value whose source has precedence may be selected as a resolved parameter value. In addition, the method may include presenting a user with a representation of a set of the resolved parameter values, permitting the user to modify at least one of the resolved parameter values to yield a user-modified parameter value and processing a first portion of the print job using the identified process plan template, at least one of the resolved parameter values, and any user-modified parameter values.

DETAILED DESCRIPTION

Figure 1:
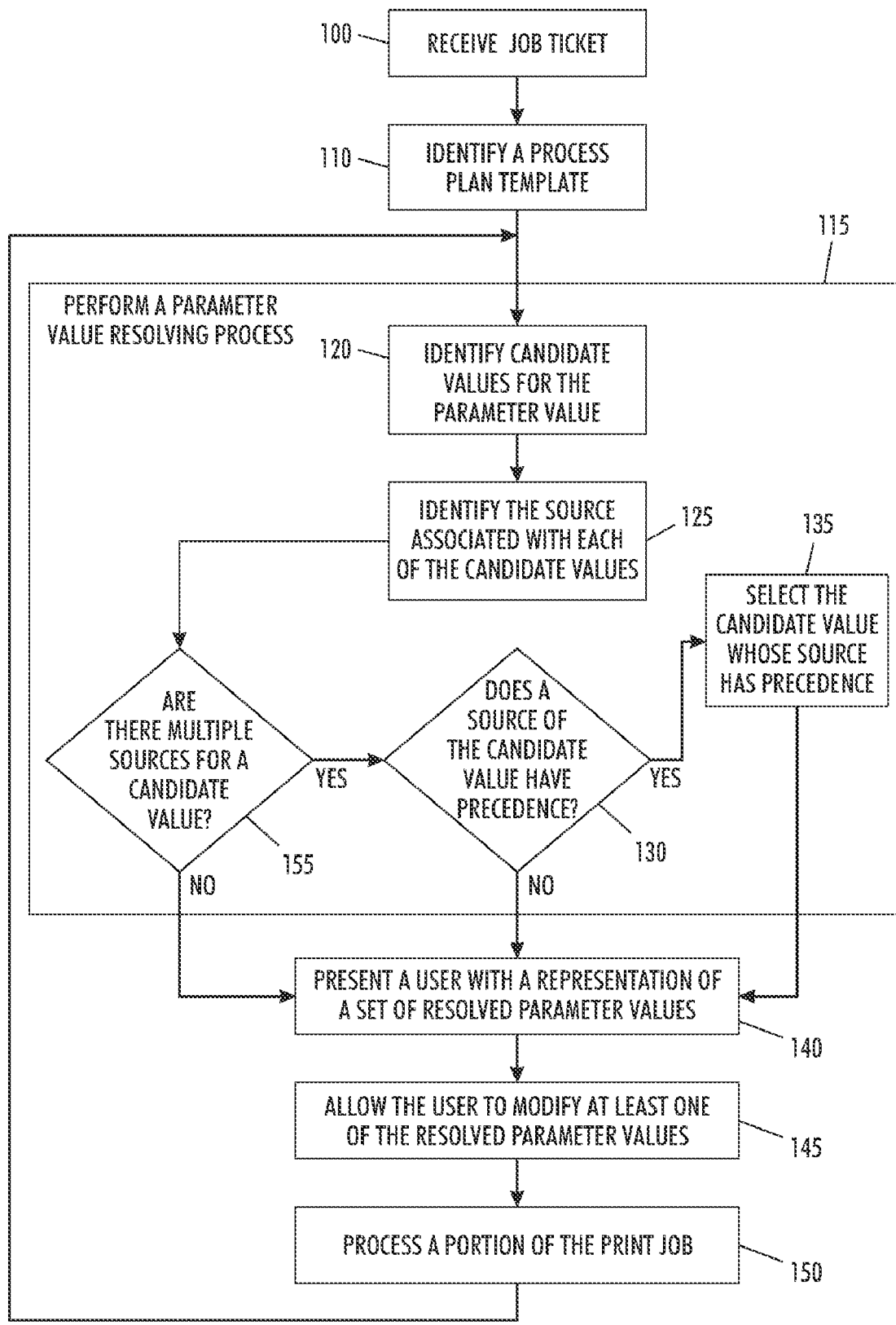
FIG. 1 depicts an exemplary flow chart for a method of processing a print job according to an embodiment.

The following terms shall have, for the purposes of this application, the meanings set forth below.

A "job" is a logical unit of work that is to be completed for a customer. In a document production environment, a job may include one or more print jobs from one or more clients. A production system may include multiple devices configured to process a plurality of jobs. Although the disclosed embodiments pertain to document production systems, the disclosed methods and systems can be applied to production systems in general.

A "print job" is a job processed in a document production environment. For example, a print job may include a unit of work that results in the production of credit card statements corresponding to a certain credit card company, bank statements corresponding to a certain bank, a document or the like. Although the disclosed embodiments pertain to print jobs, the disclosed methods and systems can be applied to jobs in general in other production environments, such as automotive manufacturing, semiconductor production and the like.

A "job ticket" is an electronic record that defines how a job is to be assembled, processed, finished and the like. A job ticket may exist in one or more formats such as Xerox Printing Instruction Format ("XPIF"), Job Definition Format ("JDF"), American Standard Code for Information Interchange ("+ASCII") format and the like. Alternatively, a job ticket may be represented by a plurality of distinct files. For example, a Comma Separated Variable ("CSV") file may reference multiple files that in combination may represent a complete job ticket. A CSV file may reference a JDF job ticket, for example, which in turn may reference one or more Portable Document Format ("PDF") files.

A "parameter" is a variable that corresponds to one or more features of a particular job. For example, a job ticket may include one or more parameters that define the processing features associated with the job, such as imposition, separation, trapping and the like. Exemplary parameters may also include print quantity, margin values, watermark text, runtime variables and the like. Parameters may also include non-production information such as customer name, customer contact information and the like.

A "runtime variable" is a parameter for which the final value is not ascertainable until the processing of a particular job has partially or fully occurred. Exemplary runtime variables may include sheet numbers, timestamps, total page count, headers, footers and the like.

A "source" is a location in memory from which one or more parameter values may be obtained. Exemplary sources may include a job's manifest, a CSV column, a JDF job ticket value, an XPIF job ticket value, a Page Description Language ("PDL") property, PDL metadata, parameterized file names and the like. For example, a job name parameter value may be determined based on data in a column in a CSV file, a field name in a JDF job ticket, a PDF filename or the like.

A "processing instruction" is an operation that is performed on at least a portion of a job. Exemplary processing instructions may include instructions relating to trim, folding, imposition and the like.

A "process plan template" is a plan for processing a job. The process plan template may include a sequence of processing instructions to be executed, parameter values, corresponding default values and the like.

"Resolving" is the process of selecting a value of a parameter from a set of multiple candidate values. Resolving may include identifying candidate values for a parameter and identifying the sources associated with the candidate values.

A "manipulation" is an operation or function that is performed on a parameter value. A manipulation may include an arithmetic operation, a logical operation, a string operation or the like.

FIG. 1 illustrates an exemplary flow chart for a method of processing a print job according to an embodiment. A job ticket may be received 100 for processing. A job may be processed based on one or more parameter values from a corresponding job ticket. In an embodiment, the job ticket may include information used to control prepress and production workflows in a document production environment. A prepress workflow may perform preparatory services on print jobs before the print jobs reach a production stage. Prepress services may include image processing, document size selection and/or other similar services. A production workflow may perform processing services on print jobs such as printing, cutting, collating, binding and the like. In an embodiment, a job ticket may include imaging instructions, finishing instructions, formatting instructions, processing instructions or the like. Each instruction may correspond to one or more parameters that may define how the Job is to be assembled, processed, finished and/or the like.

A process plan template may be identified 110. The process plan template is a detailed plan for processing a job and may include a sequence of processing instructions to be executed, parameter values, corresponding default values and the like.

A parameter value resolving process may be performed 115 for each job ticket parameter. In an embodiment, resolving may include identifying 120 a plurality of candidate values for each job ticket from a plurality of sources. For example, there may be three different sources for a print quantity parameter and, as such, three different candidate values as illustrated by Table 1.

TABLE 1

| Print Quantity Source | Candidate Value |
| --- | --- |
| Job ticket | 1092 |
| PDL Property | 850 |
| PDL Metadata | 902 |

In an embodiment, the source associated with each of the candidate values may be identified 125. Sources of candidate values may include, for example, an additional Job ticket, a PDL property, PDL metadata, a portable document format file keyword or the like. In an embodiment, it may be determined 155 whether there are multiple sources for a given candidate value. If so, it may be determined 130 whether a source of one of the candidate values has a precedence over the sources of the other candidate values. If a source has precedence, the candidate value whose source has precedence may be selected 135 as a resolved parameter value.

In an embodiment, determining 130 precedence may include receiving, from a user, precedence values for each source associated with a job ticket parameter and identifying the source with the highest precedence value. For example, possible sources for a page quantity parameter value may be a job ticket and the process plan template. A user may assign the job ticket a higher precedence than the process plan template. As such, the job ticket may provide the page count parameter value for the corresponding job.

In an embodiment, a user may be presented with an import user interface dialog, a field mapping user interface dialog or the like with which the user may select a source. Alternatively, a user may select a source via a configuration file defining the relationship between the source and the parameter.

In another embodiment, determining 130 precedence may include receiving, from a user, an information type associated with a source of the parameter value. For example, a user may indicate the type of information that should be used as the source of the parameter, such as a CSV column, a JDF job ticket value, an XPIF job ticket value, a PDL property, PDL metadata and/or the like. A set of candidate sources may be determined based on the information type, and the set may be presented to a user. For example, if a user indicates the information type is a PDL property, the user may be presented with a set of PDL property sources from which the user may select the source.

Referring back to FIG. 1, in some embodiments the user may be presented 140 with a representation of a set of the resolved parameter values, and the user may be allowed to modify 145 at least one of the resolved parameter values. In an embodiment, a user may select a source of at least one of the resolved parameter values and the candidate value for the user-selected source may be automatically used as the user-modified parameter value.

In an embodiment, a user may modify 145 a resolved parameter value by performing one or more manipulations on the parameter value. Parameter manipulation may include string manipulation, arithmetic manipulation, logical manipulation and the like. Alternatively, the user may choose not to modify the value of a parameter value, in which case the resolved parameter value will be used.

String manipulation may include applying substring functions, concatenation functions or other similar functions common to programming languages to a parameter value. For example, if a print quantity parameter associated with a print job has a value of "printjob1_243," a substring function may be applied to the parameter value such that the final value of the parameter is assigned a substring of the parameter value, such as the last three characters (i.e., 243).

Arithmetic manipulation may include applying one or more arithmetic operations, such as addition, subtraction, multiplication, division or the like, to a parameter value. For example, if a copy count parameter has a value of '200,' the parameter value may be divided by an imposition value. An imposition value may represent the number of times a single page of a document may be printed on a single sheet. For example, the same page may be printed twice on a single sheet, and thus has an imposition value of '2.' Using this example, the parameter value (i.e., 200) may be divided by the imposition value (i.e., 2) to determine a final copy count parameter value (i.e., 100).

Logical manipulations may include mapping a parameter value using a lookup table or the like to determine a final parameter value. In an embodiment, a parameter value may be a number, a string or the like. For example, using a lookup table, if a print quantity parameter has a value '10,' the final print parameter may have a value '100.' The final parameter value may be determined using defined mapping instructions, a hash table, a lookup table or the like. Alternatively, if a parameter value is in a certain range, the final parameter value may have a specific value. For example, if a print quantity parameter has a value between '10' and '20,' the parameter may be assigned a final parameter value of '100.' Logical manipulations may also include the use of AND operations, OR operations and the like.

In an embodiment, a user may manipulate one or more parameter values using one or more string, arithmetic and/or logical manipulations. For example, a user may select a parameter value to modify and may be presented with an interface area in which the user may enter text that reflects possible values for the parameter. A user may add multiple parameter entries and may browse through the entries.

In an embodiment, a user may be presented with an interface area that displays a parameter value and possible manipulations. A user may select a type of manipulation to perform on a parameter value, and the user may be presented with options corresponding to the selected type of manipulation. For example, if a user selects padding as the type of manipulation, the system may present options for left or right padding, a pad character, a number of characters to pad or the like.

In an embodiment, a user may add a lookup table to a parameter value. The system may present a user with an interface that may allow the user to specify a series of conditional statements, such as if statements, else if statements and else statements, that may be evaluated against the parameter value. Each conditional statement may be associated with a value which may be used as the final parameter value if the conditional statements evaluate to true. In an embodiment, the first conditional statement that evaluates to true may be used to determine the final value of the parameter.

Referring back to FIG. 1, a first portion of the print job may be processed 150 using the identified process plan template, at least one of the resolved parameter values and any user-modified values. In an embodiment, the resolved parameter values may be applied to the process plan template. After at least one instruction from the identified process plan template has been implemented, the parameter value resolving process may be performed for each parameter value that has not yet been resolved to yield at least one subsequently-resolved parameter value. For example, a copy count parameter value may depend on the value of an imposition parameter value. Once the source and final value of the imposition parameter value have been determined, the process may be repeated using the final value of the imposition parameter to determine whether a source of a copy count parameter can be identified. If so, the final value of the copy count parameter may be resolved.

In an embodiment, a second portion of the print job may be processed using the identified process plan template, the parameter values that were resolved before processing the first portion occurred, any user-modified parameter values and each of the subsequently-resolved parameter values. The next unexecuted processing instruction in the sequence may then be executed, and, if the source of at least one parameter is still unknown, the process may again be repeated. This process may be performed until all of the processing instructions in the sequence have been executed and/or until all of the parameter values have been resolved.

In an embodiment, processing a print job may include using the final value of one or more parameters to perform a plurality of operations on the print job. In such an embodiment, a final value of a parameter may be used for a purpose other than its intended purpose. For example, a final value of a print quantity parameter may be used in an automated workflow to make decisions regarding job routing. In an embodiment, print jobs having print quantity parameter values exceeding a specified threshold value may be routed to certain resources, autonomous cells or the like.

In an embodiment, print jobs having small print quantity parameter values may be routed to a workflow branch that may perform one or more optimization programs to increase throughput. In an embodiment, an annotation, such as a watermark or the like, that includes one or more parameter values may be displayed on one or more pages of a print job. In addition, an email notification having a message body that includes one or more parameter values may be generated and sent to one or more specified or determined recipients.

Figure 2:
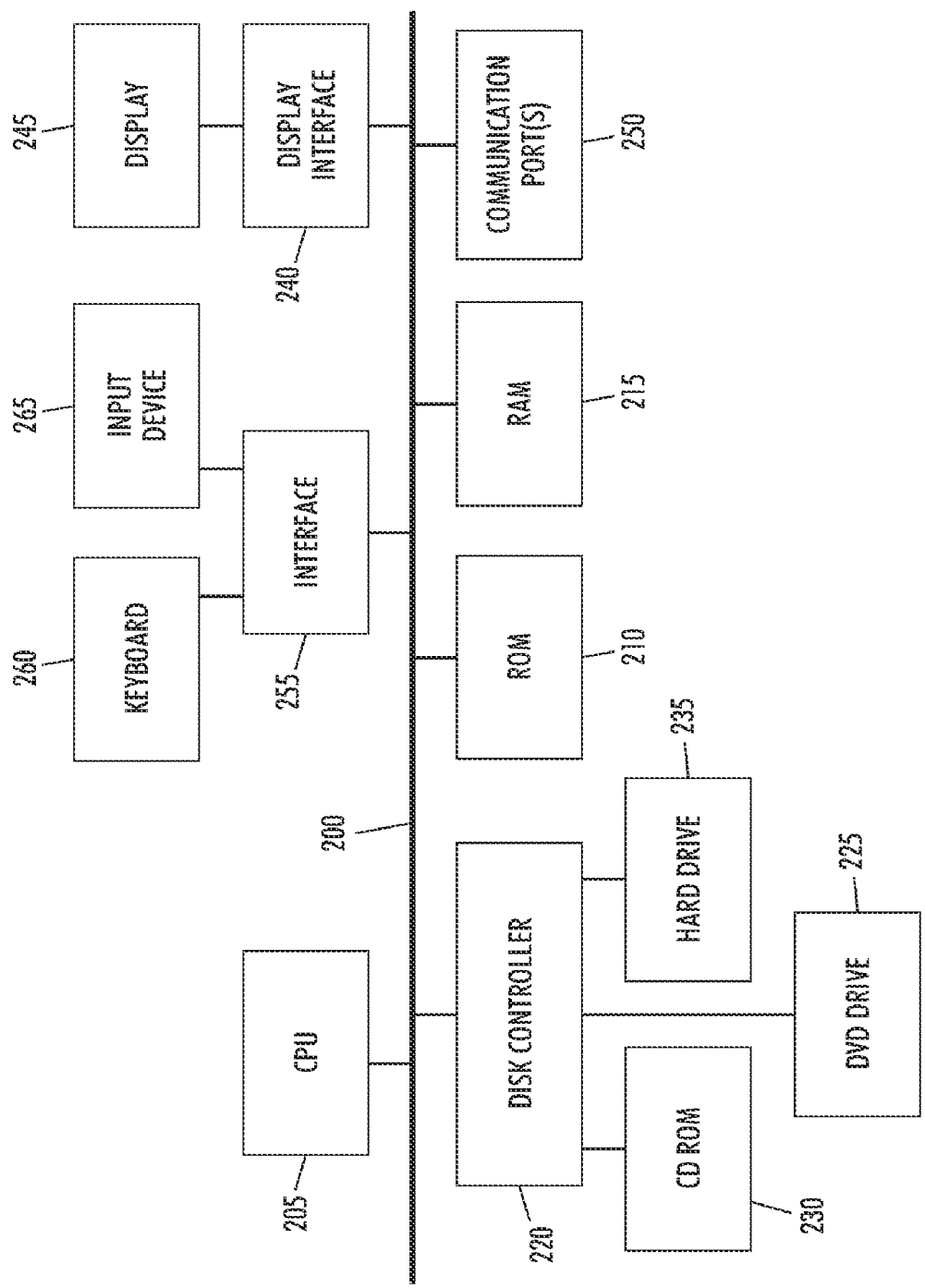
FIG. 2 depicts a block diagram of exemplary internal hardware that may be used to contain or implement program instructions according to an embodiment.

FIG. 2 depicts a block diagram of exemplary internal hardware that may be used to contain or implement the program instructions according to an embodiment. Referring to FIG. 2, a bus 200 serves as the main information highway interconnecting the other illustrated components of the hardware. CPU 205 is the central processing unit of the system, performing calculations and logic operations required to execute a program. Read only memory (ROM) 210 and random access memory (RAM) 215 constitute exemplary memory devices.

A disk controller 220 interfaces with one or more optional disk drives to the system bus 200. These disk drives may include, for example, external or internal DVD drives 225, CD ROM drives 230 or hard drives 235. As indicated previously, these various disk drives and disk controllers are optional devices.

Program instructions may be stored in the ROM 210 and/or the RAM 215. Optionally, program instructions may be stored on a computer readable medium such as a flash memory, compact disk or a digital disk or other processor-readable storage media.

An optional display interface 240 may permit information from the bus 200 to be displayed on the display 245 in audio, graphic or alphanumeric format. Communication with external devices may occur using various communication ports 250. An exemplary communication port 250 may be attached to a communications network, such as the Internet or an intranet.

In addition to the standard computer-type components, the hardware may also include an interface 255 which allows for receipt of data from input devices such as a keyboard 260 or other input device 265 such as a mouse, remote control, pointer and/or joystick.

An embedded system, such as a sub-system within a xerographic apparatus, may optionally be used to perform one, some or all of the operations described herein. Likewise, a multiprocessor system may optionally be used to perform ones some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing a print job in a document production environment, comprising:
   receiving a job ticket for the print job, wherein the job ticket comprises one or more job ticket parameters for processing the print job;
   identifying a process plan template comprising one or more processing instructions for processing the print job;
   performing, by a computing device, a parameter value resolving process for each job ticket parameter to yield a set of resolved parameter values by:
   identifying a plurality of candidate values for the job ticket parameter, wherein each of the plurality of candidate values is associated with a source, and
   determining whether the source associated with one of the plurality of candidate values has precedence over the sources for the other candidate values, and if so, selecting a candidate value of the plurality of candidate values whose source has precedence as a resolved parameter value;
   presenting a user with a representation of the set of the resolved parameter values, and permitting the user to modify at least one of the resolved parameter value of the set of resolved parameter values to yield a user-modified parameter value;
   processing a first portion of the print job using the identified process plan template, at least one resolved parameter value of the set of the resolved parameter values, and the user-modified parameter values, wherein using the resolved parameter value in the processing of the first portion of the print job comprises:

assigning a substring value associated with the at least one resolved parameter value to yield a corresponding final value, and applying the corresponding final value to the identified process plan template;

after at least one instruction from the identified process plan template has been implemented, performing the parameter value resolving process for each parameter value that has not yet been resolved to yield at least one subsequently-resolved parameter value; and processing a second portion of the print job using the identified process plan template, the set of resolved parameter values, the user-modified parameter values, and each of the at least one subsequently-resolved parameter values.

2. The method of claim 1, wherein the plurality of sources from which the plurality of candidate values are identified comprise at least one of the following:

an additional job ticket; a page description language property;

page description language metadata; and a portable document format file keyword.

3. The method of claim 1, wherein determining whether one of the plurality of candidate values has the source with precedence over the sources for the other candidate values comprises:

receiving, from the user, a precedence value for each of one or more sources associated with the job ticket parameter; and identifying the source with the highest precedence value.

4. The method of claim 1, wherein determining whether one of the plurality of candidate values has the source with precedence over the sources for the other candidate values comprises:

receiving, from the user, an information type associated with the source of the parameter value;

determining a set of candidate sources corresponding to the information type;

presenting the set of candidate sources to the user; and receiving, from the user, a source selection from the set of candidate sources.

5. The method of claim 1, wherein using the resolved parameter value in the processing of the first portion of the print job comprises applying the resolved parameter value to the process plan template.

6. The method of claim 1, wherein using the resolved parameter value in the processing of the first portion of the print job comprises:

concatenating one or more additional parameter values and the resolved parameter value to yield a corresponding final value; and applying the corresponding final value to the process plan template.

7. The method of claim 1, wherein using the resolved parameter value in the processing of the first portion of the print job comprises:

performing one or more arithmetic manipulations on the resolved parameter value to yield the corresponding final value; and applying the corresponding final value to the process plan template.

8. The method of claim 1, wherein using the resolved parameter value in the processing of the first portion of the print job comprises:

mapping the resolved parameter value to a corresponding final value; and applying the corresponding final value to the process plan template.

9. The method of claim 1, wherein resolving the parameter value comprises:

performing one or more logical manipulations on the parameter value to determine the corresponding final value.

10. The method of claim 1, wherein permitting the user to modify the at least one of the resolved parameter values to yield the user-modified parameter value comprises:

permitting the user to select a source of the at least one of the resolved parameter values; and automatically selecting the candidate value for the user-selected source as the user-modified parameter value.

11. A method of processing a print job in a document production environment, comprising:

receiving a job ticket for the print job, wherein the job ticket comprises one or more job ticket parameters for processing the print job;

identifying a process plan template comprising one or more processing instructions for processing the print job;

performing, by a computing device, a parameter value resolving process for each job ticket parameter to yield a first set of resolved parameter values, wherein performing the parameter value resolving process for each job ticket parameter comprises:

identifying, from a plurality of sources, a plurality of candidate values for the job ticket parameter;

identifying a source of the plurality of sources associated with each of the candidate values, determining whether one of the plurality of candidate values has a source with precedence over the sources for the other candidate values, and if so, selecting a candidate value of the plurality of candidate values whose source has precedence as a resolved parameter value;

displaying at least one of the one or more job ticket parameters and one or more manipulations associated with the at least one of the one or more job ticket parameters;

receiving, from a user, a selection of a displayed job ticket parameter and a manipulation of the one or more manipulations associated with the displayed job ticket parameter, wherein the selected manipulation comprises assigning a substring value associated with the displayed job ticket parameter;

applying the selected manipulation to the selected displayed job ticket parameter in the first set of resolved parameter values to yield a first set of final parameter values;

processing a first portion of the print job using the identified process plan template and the first set of final parameter values;

after at least one instruction from the identified process plan template has been implemented, performing the parameter value resolving process for each parameter value that has not yet been resolved to yield a second set of resolved parameter values; and processing a second portion of the print job using the identified process plan template, the first set of final parameter values, and the second set of resolved parameter values.

12. A method of processing a print job in a document production environment, comprising:

receiving a job ticket for the print job, wherein the job ticket comprises one or more job ticket parameters for processing the print job;

identifying a process plan template comprising one or more processing instructions for processing the print job;

performing, by a computing device, a parameter value resolving process for each job ticket parameter to yield a set of resolved parameter values by:
  receiving, from a user, an information type associated with a source of the job ticket parameter,
  identifying a plurality of candidate values for the job ticket parameter, wherein each identified candidate value is associated with a source having the information type, and
  determining whether the source associated with one of the plurality candidate values has a precedence over the sources for the other candidate values, and if so, selecting the candidate value whose source has precedence as a resolved parameter value;

presenting a user with a representation of the set of the resolved parameter values, and permitting the user to modify at least one resolved parameter values of the set of resolved parameter values to yield a user-modified parameter value;

processing a first portion of the print job using the identified process plan template, at least one resolved parameter value of the set of resolved parameter values, and the user-modified parameter value, wherein using the resolved parameter value in the processing of the first portion of the print job comprises:
  assigning a substring value associated with the at least one resolved parameter value to yield a corresponding final value, and
  applying the corresponding final value to the identified process plan template;

after at least one instruction from the identified process plan template has been implemented, performing the parameter value resolving process for each parameter value that has not yet been resolved to yield at least one subsequently-resolved parameter value; and processing a second portion of the print job using the identified process plan template, the set of resolved parameter values, the user-modified parameter value, the at least one subsequently-resolved parameter value.

13. A system for processing a print job in a document production environment, the system comprising:
  a processor; and
  a processor-readable storage medium containing one or more programming instructions for performing a method of processing the print job in a document production environment, the method comprising:
    receiving a job ticket for the print job, wherein the job ticket comprises one or more job ticket parameters for processing the print job,
    identifying a process plan template comprising one or more processing instructions for processing the print job,
    performing a parameter value resolving process for each job ticket parameter to yield a set of resolved parameter values by:
      identifying a plurality of candidate values for the job ticket parameter, wherein each of the plurality of candidate values is associated with a source, and
      determining whether the source associated with one of the plurality of candidate values has precedence over the sources for the other candidate values, and if so, selecting the candidate value whose source has precedence as a resolved parameter value;
    presenting a user with a representation of the set of the resolved parameter values, and permitting the user to modify at least one resolved parameter value of the set of resolved parameter values to yield a user-modified parameter value,
    processing a first portion of the print job using the identified process plan template, at least one resolved parameter value of the set of the resolved parameter values, and the user-modified parameter values, wherein using the resolved parameter value in the processing of the first portion of the print job comprises:
      assigning a substring value associated with the resolved parameter value to yield a corresponding final value, and
      applying the corresponding final value to the process plan template,
    after at least one instruction from the identified process plan template has been implemented, performing the parameter value resolving process for each parameter value that has not yet been resolved to yield at least one subsequently-resolved parameter value, and
    processing a second portion of the print job using the identified process plan template, the set of resolved parameter values, the user-modified parameter value, and the at least one subsequently-resolved parameter values.

14. The system of claim 13, wherein the one or more programming instructions for determining whether one of the plurality of candidate values has a source with precedence over the sources for the other candidate values comprises one or more programming instructions for:
  receiving, from the user, a precedence value to each of one or more sources associated with the job ticket parameter; and
  identifying the source with the highest precedence value.

15. The system of claim 13, wherein the one or more programming instructions for determining whether one of the plurality of candidate values has the source with precedence over the sources for the other candidate values comprises one or more programming instructions for:
  receiving, from the user, an information type associated with the source of the parameter value;
  determining a set of candidate sources corresponding to the information type;
  presenting the set of candidate sources to the user; and
  receiving, from the user, a source selection from the set of candidate sources.

16. The system of claim 13, wherein the one or more programming instructions for using the at least one resolved parameter value in the processing of the first portion of the print job comprises one or more programming instructions for applying the at least one resolved parameter value to the process plan template.

17. The system of claim 13, wherein the one or more programming instructions for permitting the user to modify the at least one resolved parameter values to yield the user-modified parameter value comprises one or more programming instructions for:
  permitting the user to select a source of the at least one resolved parameter values; and
  automatically selecting the candidate value of the plurality of candidate values for the user-selected source as the user-modified parameter value.

* * * * *